(12) United States Patent
Ching et al.

(10) Patent No.: US 11,091,266 B2
(45) Date of Patent: Aug. 17, 2021

(54) CONFORMABLE TANK FABRICATED USING ADDITIVE MANUFACTURING

(71) Applicant: Goodrich Corporation, Charlotte, NC (US)

(72) Inventors: Nathaniel Ching, Hartville, OH (US); Casey Slane, Richwood, OH (US); Jin Hu, Hudson, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/689,599

(22) Filed: Aug. 29, 2017

(65) Prior Publication Data

US 2019/0061948 A1    Feb. 28, 2019

(51) Int. Cl.
*B65D 1/16*     (2006.01)
*B65D 90/02*    (2019.01)
(Continued)

(52) U.S. Cl.
CPC ............ *B64D 11/00* (2013.01); *B29C 64/118* (2017.08); *B29C 64/393* (2017.08); *B33Y 10/00* (2014.12); *B33Y 50/02* (2014.12); *B33Y 80/00* (2014.12); *B64C 3/34* (2013.01); *B64D 37/02* (2013.01); *B64D 37/04* (2013.01); *B64D 37/06* (2013.01); *B29K 2105/08* (2013.01);
(Continued)

(58) Field of Classification Search
CPC ......... B33Y 80/00; B33Y 10/00; B33Y 50/02; B64D 37/02; B64D 37/04; B64D 37/06; B64D 11/0007; B64D 11/02; B64D 11/00; B64D 37/08; B64C 3/34; B29L 2031/712; B29C 64/118; B29C 64/393; B29K 2105/08; B65D 47/02; B65D 1/40; B65D 1/0223; B65D 85/72; B65D 88/128; F17C 1/00; F17C 1/16; B60K 15/03; B60K 15/073; B60K 2015/03032; B60K 2015/0344

USPC ..... 220/562, 563, 564, 581, 4.12; 244/135 R
See application file for complete search history.

(56) References Cited

U.S. PATENT DOCUMENTS 1,499,817 A * 7/1924 Fokker ................... B64D 37/04
                                                  244/135 R
1,507,527 A * 9/1924 Strine ..................... B64C 39/08
                                                   244/45 R
(Continued)

FOREIGN PATENT DOCUMENTS

CN    103538817 A      1/2014
DE       299677    *   6/1920
(Continued)

OTHER PUBLICATIONS

Extended European Search Report for European Patent Application No. 18190532.4, dated Jan. 25, 2019, 7 pages.
(Continued)

*Primary Examiner* — Gideon R Weinerth
(74) *Attorney, Agent, or Firm* — Kinney & Lange, P.A.

(57) ABSTRACT

A conformable tank includes a body with a plurality of walls defining a cavity in the body, and an internal support connected to an internal surface of one of the plurality of wall of the body and protruding into the cavity of the body. The body and the internal support are an additively manufactured integral structure formed by a fiber filament reinforced composite material.

18 Claims, 9 Drawing Sheets

(51) Int. Cl.
*B60K 15/03* (2006.01)
*B60K 15/073* (2006.01)
*B64D 37/02* (2006.01)
*B64D 11/00* (2006.01)
*B29C 64/393* (2017.01)
*B33Y 50/02* (2015.01)
*B29C 64/118* (2017.01)
*B33Y 10/00* (2015.01)
*B33Y 80/00* (2015.01)
*B64C 3/34* (2006.01)
*B64D 37/06* (2006.01)
*B64D 37/04* (2006.01)
*B64D 11/02* (2006.01)
*B29L 31/00* (2006.01)
*B29K 105/08* (2006.01)

(52) U.S. Cl.
CPC ......... *B29L 2031/712* (2013.01); *B60K 15/03* (2013.01); *B64D 11/0007* (2013.01); *B64D 11/02* (2013.01)

(56) References Cited

U.S. PATENT DOCUMENTS

| | | | |
|---|---|---|---|
| 1,553,122 A * | 9/1925 | Thomas | B64D 37/04 244/135 R |
| 1,640,471 A | 8/1927 | Staley | |
| 1,816,130 A * | 7/1931 | Sikorsky | B64D 37/04 244/123.1 |
| 1,835,370 A * | 12/1931 | Bellanca | B64D 37/04 244/135 R |
| 1,870,595 A * | 8/1932 | Thaden | B64D 37/04 244/135 R |
| 1,894,675 A * | 1/1933 | Dixon | B64D 37/02 220/692 |
| 1,969,200 A * | 8/1934 | Bellanca | B64D 37/04 244/135 R |
| 2,373,221 A * | 4/1945 | Blaylock | B64D 37/06 220/4.15 |
| 2,374,386 A * | 4/1945 | Shakesby | B64D 37/06 249/183 |
| 2,377,722 A * | 6/1945 | Shakesby | B64D 37/06 156/69 |
| 2,401,625 A * | 6/1946 | Eger | B64D 37/06 156/191 |
| 2,401,626 A * | 6/1946 | Eger | B29D 22/003 156/214 |
| 2,401,627 A * | 6/1946 | Eger | B29D 22/003 220/560.02 |
| 2,425,514 A * | 8/1947 | Dasher | B64D 37/06 220/560.02 |
| 2,458,245 A * | 1/1949 | Bordelon | B64F 1/28 244/135 R |
| 2,461,096 A | 2/1949 | Wagner | |
| 2,516,100 A | 7/1950 | Boardman | |
| 2,533,431 A | 12/1950 | Chausson | |
| 2,552,119 A * | 5/1951 | Scharenberg | B64D 37/06 220/563 |
| 2,557,861 A * | 6/1951 | Blocher | B64D 37/06 220/9.1 |
| 2,594,235 A * | 4/1952 | Taylor | B64D 37/06 244/135 B |
| 2,634,019 A | 4/1953 | Pfaff | |
| 2,672,254 A | 3/1954 | Boardman | |
| 2,691,134 A * | 10/1954 | Ford | G01M 3/045 324/694 |
| 2,731,938 A * | 1/1956 | Eagon | B64D 37/005 116/228 |
| 2,736,356 A * | 2/1956 | Oates, Jr. | B60K 15/03177 222/107 |
| 2,806,665 A * | 9/1957 | Gibson | B64D 37/06 244/135 R |
| 2,850,083 A * | 9/1958 | Frost | B64D 37/04 137/576 |
| 2,947,439 A | 8/1960 | McGrath | |
| 3,233,651 A * | 2/1966 | Smith | B64D 37/20 137/115.27 |
| 3,288,186 A | 11/1966 | Headrick | |
| 3,314,567 A | 4/1967 | Becker et al. | |
| 3,447,768 A | 6/1969 | McQueen | |
| 3,931,907 A | 1/1976 | Henle | |
| 4,287,913 A | 9/1981 | Bennett et al. | |
| 4,432,515 A | 2/1984 | Jarvineva | |
| 4,444,366 A * | 4/1984 | Limoncelli | B64D 37/02 141/325 |
| 4,709,821 A * | 12/1987 | Guiffray | B65D 1/0223 215/382 |
| 4,858,778 A | 8/1989 | Patrick | |
| 4,941,583 A | 7/1990 | Gerhard | |
| 4,946,056 A | 8/1990 | Stannard | |
| 5,037,005 A * | 8/1991 | Appleby | B65D 47/2075 222/184 |
| 5,042,751 A | 8/1991 | Kolom | |
| 5,071,166 A | 12/1991 | Marino | |
| 5,083,727 A | 1/1992 | Pompei et al. | |
| 5,085,343 A | 2/1992 | Scarr | |
| 5,103,996 A | 4/1992 | McGarvey | |
| 5,303,739 A | 4/1994 | Ellgoth et al. | |
| 5,310,080 A * | 5/1994 | Figge, Sr. | B60K 15/063 220/562 |
| 5,367,879 A | 11/1994 | Doke et al. | |
| 5,383,566 A | 1/1995 | Johnson | |
| 5,389,839 A | 3/1995 | Kleyn | |
| 5,476,189 A | 12/1995 | Duvall et al. | |
| 5,620,111 A | 4/1997 | Gehman | |
| 5,647,503 A | 7/1997 | Steele et al. | |
| 5,651,474 A | 7/1997 | Callaghan et al. | |
| 5,697,511 A | 12/1997 | Bampton | |
| 5,758,796 A | 6/1998 | Nishimura et al. | |
| 5,779,092 A * | 7/1998 | Hehn | B60P 3/224 137/574 |
| 5,845,879 A | 12/1998 | Jensen | |
| 5,848,720 A | 12/1998 | Logan | |
| 5,927,651 A | 7/1999 | Geders et al. | |
| 5,936,861 A * | 8/1999 | Jang | B29C 70/384 700/98 |
| 5,944,215 A | 8/1999 | Orlowski | |
| 6,044,999 A | 4/2000 | Kido | |
| 6,090,465 A | 7/2000 | Steele et al. | |
| 6,422,514 B1 | 7/2002 | Clark et al. | |
| 6,668,561 B1 | 12/2003 | Sheu et al. | |
| 6,691,889 B1 | 2/2004 | Falk | |
| 6,837,464 B1 | 1/2005 | Kirn et al. | |
| 7,195,133 B1 | 3/2007 | Cundiff et al. | |
| 7,396,459 B2 | 7/2008 | Thorpe | |
| 7,803,241 B2 | 9/2010 | Cundiff et al. | |
| 7,810,670 B2 | 10/2010 | Carter et al. | |
| 8,192,666 B2 | 6/2012 | Strack et al. | |
| 8,235,242 B2 | 8/2012 | Ha | |
| 8,794,476 B2 | 8/2014 | Hausberger et al. | |
| 8,851,424 B2 * | 10/2014 | Barbosa | B64D 37/04 244/135 C |
| 8,917,809 B2 | 12/2014 | Nozawa | |
| 8,939,407 B2 | 1/2015 | Robinson et al. | |
| 9,126,365 B1 * | 9/2015 | Mark | B29C 70/20 |
| 9,243,751 B2 | 1/2016 | Clark et al. | |
| 9,458,955 B2 * | 10/2016 | Hammer | B29C 33/52 |
| 9,470,366 B2 | 10/2016 | Dullaert et al. | |
| 9,476,546 B2 | 10/2016 | Croteau et al. | |
| 9,523,466 B2 | 12/2016 | Nishimoto et al. | |
| 9,731,810 B1 * | 8/2017 | Canole | B64C 3/34 |
| 10,081,129 B1 * | 9/2018 | Alvarado | B33Y 30/00 |
| 10,099,427 B2 * | 10/2018 | Mark | B29C 70/20 |
| 10,703,481 B2 * | 7/2020 | Slane | E03B 11/00 |
| 2002/0179610 A1 | 12/2002 | Franklin, III et al. | |
| 2003/0044593 A1 * | 3/2003 | Vaidyanathan | B29B 15/122 428/297.4 |
| 2004/0159663 A1 | 8/2004 | Fenton | |
| 2004/0173618 A1 | 9/2004 | Suzuki et al. | |
| 2004/0178205 A1 | 9/2004 | Balzer et al. | |

(56) References Cited

U.S. PATENT DOCUMENTS

| | | |
|---|---|---|
| 2005/0129889 A1 | 6/2005 | Davis et al. |
| 2007/0108348 A1* | 5/2007 | Peters .................... B65D 90/22 |
| | | 244/135 R |
| 2007/0158343 A1 | 7/2007 | Shimada et al. |
| 2007/0289451 A1 | 12/2007 | Rice |
| 2008/0110900 A1 | 5/2008 | Veenehdaal |
| 2009/0050743 A1* | 2/2009 | Barbosa ................. B64D 37/04 |
| | | 244/135 A |
| 2009/0174709 A1* | 7/2009 | Kozlak .................... G06F 17/50 |
| | | 345/420 |
| 2009/0314785 A1 | 12/2009 | Cronin et al. |
| 2010/0084030 A1 | 4/2010 | Mackulin et al. |
| 2010/0116778 A1 | 5/2010 | Melrose |
| 2011/0168728 A1 | 7/2011 | McDermott et al. |
| 2012/0217249 A1 | 8/2012 | Baika et al. |
| 2013/0048646 A1* | 2/2013 | Kataoka .................. F16J 12/00 |
| | | 220/581 |
| 2013/0213973 A1 | 8/2013 | Esser |
| 2014/0291331 A1 | 10/2014 | Morales et al. |
| 2014/0328964 A1* | 11/2014 | Mark ...................... B29C 70/20 |
| | | 425/166 |
| 2015/0258740 A1 | 9/2015 | Kang et al. |
| 2016/0061381 A1 | 3/2016 | Kotliar |
| 2016/0068235 A1 | 3/2016 | Ohtsuka et al. |
| 2016/0070254 A1 | 3/2016 | Hovsepian et al. |
| 2016/0161057 A1 | 6/2016 | Kang et al. |
| 2016/0238193 A1 | 8/2016 | Meyer |
| 2016/0257403 A1 | 9/2016 | Masuda |
| 2016/0263832 A1* | 9/2016 | Bui ........................ B33Y 10/00 |
| 2016/0272413 A1 | 9/2016 | Masuda |
| 2016/0281926 A1 | 9/2016 | Croteau et al. |
| 2016/0290564 A1 | 10/2016 | Croteau et al. |
| 2016/0341359 A1 | 11/2016 | Nishibu |
| 2016/0361869 A1 | 12/2016 | Mark et al. |
| 2017/0268206 A1* | 9/2017 | Giamati .................. E03B 11/08 |
| 2018/0103766 A1* | 4/2018 | Ou .......................... A61F 7/086 |
| 2018/0126667 A1* | 5/2018 | Wilenski ............... B29C 64/165 |
| 2019/0061947 A1* | 2/2019 | Slane ...................... E03B 11/00 |
| 2019/0061948 A1* | 2/2019 | Ching .................... B64D 11/00 |
| 2019/0061986 A1* | 2/2019 | Slane ........................ B65D 1/40 |
| 2019/0168886 A1* | 6/2019 | Angulo Ibanez ...... B64D 37/04 |
| 2020/0399009 A1* | 12/2020 | Shirangi ............. A47G 19/2205 |

FOREIGN PATENT DOCUMENTS

| | | |
|---|---|---|
| DE | 3206430 A1 | 9/1983 |
| DE | 102007018549 A1 | 10/2008 |
| DE | 102011101471 A1 | 11/2012 |
| EP | 1409917 B1 | 6/2006 |
| EP | 2392395 A1 | 12/2011 |
| EP | 2942285 A1 | 11/2015 |
| EP | 3015721 A1 | 5/2016 |
| EP | 3061709 A1 | 8/2016 |
| EP | 3073174 A1 | 9/2016 |
| FR | 2218529 A1 | 9/1974 |
| GB | 1426414 | 2/1976 |
| JP | 2005155776 A | 6/2005 |
| KR | 20100113865 A | 10/2010 |
| WO | 2016057024 A1 | 4/2016 |
| WO | WO2017091222 A1 | 6/2017 |

OTHER PUBLICATIONS

Extended European Search Report for European Patent Application No. 18190579.5, dated Jan. 29, 2019, 10 pages.
Extended European Search Report for European Patent Application No. 18191294.0, dated Jan. 31, 2019, 5 pages.
Extended European Search Report for European Patent Application No. 18193814.3, dated Feb. 12, 2019, 8 pages.
Extended European Search Report for European Patent Application No. 18194813.4 dated Mar. 8, 2019, 12 pages.
Extended European Search Report for European Patent Application No. 18194813.4, dated Jun. 26, 2019, 11 pages.
European Office Action dated Nov. 8, 2019, received for corresponding European Application No. 18190532.4, 4 pages.
European Office Action dated Mar. 13, 2020, received for corresponding European Application No. 18190579.5, 4 pages.

\* cited by examiner

CONFORMABLE TANK FABRICATED USING ADDITIVE MANUFACTURING

BACKGROUND

The present invention relates generally to pressurized tanks, and more particularly to pressurized tanks used on an aircraft for potable water.

The aircraft industry currently employs pressurized tanks constructed of dense metal alloys to transport and make use of potable water on board an aircraft. Potable water on an aircraft may be used for direct human consumption, food preparation, hygienic activities, and sanitation. For example, water may be used for the preparation of hot and cold beverages for consumption, reconstituting dehydrated foods, ingestion from cold water taps or water fountains, brushing of teeth, hand washing, cleaning of utensils, lavatory use, and onboard showering facilities.

In general, any tank for use in an aircraft is subjected to pressure, vibration, flight loads, and shock stresses. The pressure, in particular, can create large bending stresses on flat walls of the tanks. Metal tanks have internal bracing to support various sections and joints that are under such stresses, especially those portions with flat walls and sharp corners. However, metal tanks are relatively heavy. The higher the total weight of an aircraft the more fuel that is required to fly. Thus, it is desirable to find a lightweight conformable tank which can withstand the pressure, vibration, flight loads, and shock stresses encountered on board an aircraft to improve its fuel efficiency.

SUMMARY

A conformable tank includes a body with a plurality of walls defining a cavity in the body, and an internal support connected to an internal surface of one of the plurality of walls of the body and protruding into the cavity of the body. The body and the internal support are an additively manufactured integral structure formed by a fiber filament reinforced composite material.

A method of manufacturing a conformable tank including loading a CAD file with a model of a conformable tank that is to be additively manufactured into computer software. The model of the conformable tank is sliced into a plurality of layers using the computer software. The model that has been sliced into a plurality of layers is communicated to an additive manufacturing machine. The conformable tank is additively manufactured layer-by-layer with a fiber filament in each layer of the conformable tank.

DETAILED DESCRIPTION

Figure 1A:
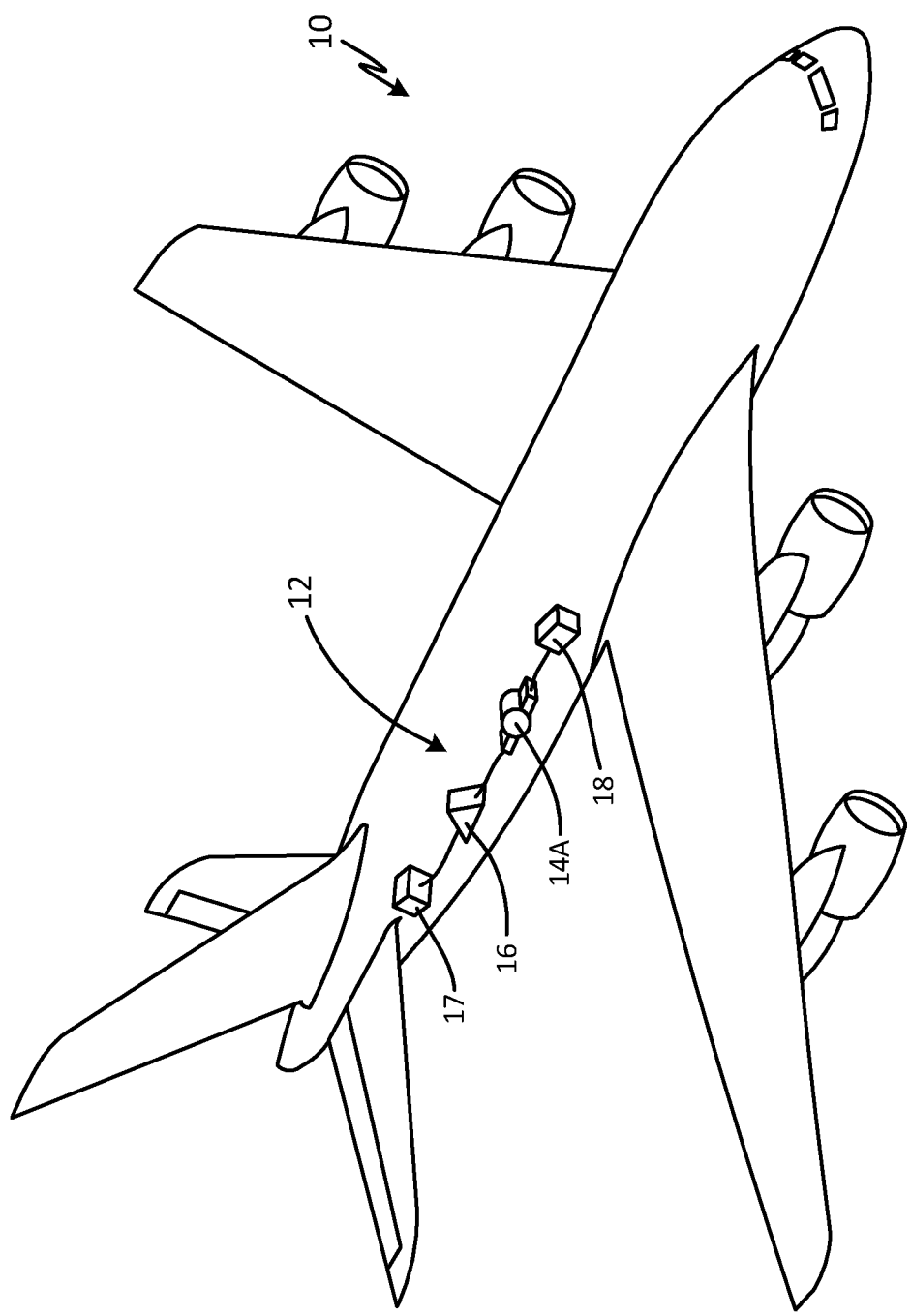
FIG. 1A is a schematic of an aircraft with a first embodiment of a potable water system.
Figure 1B:
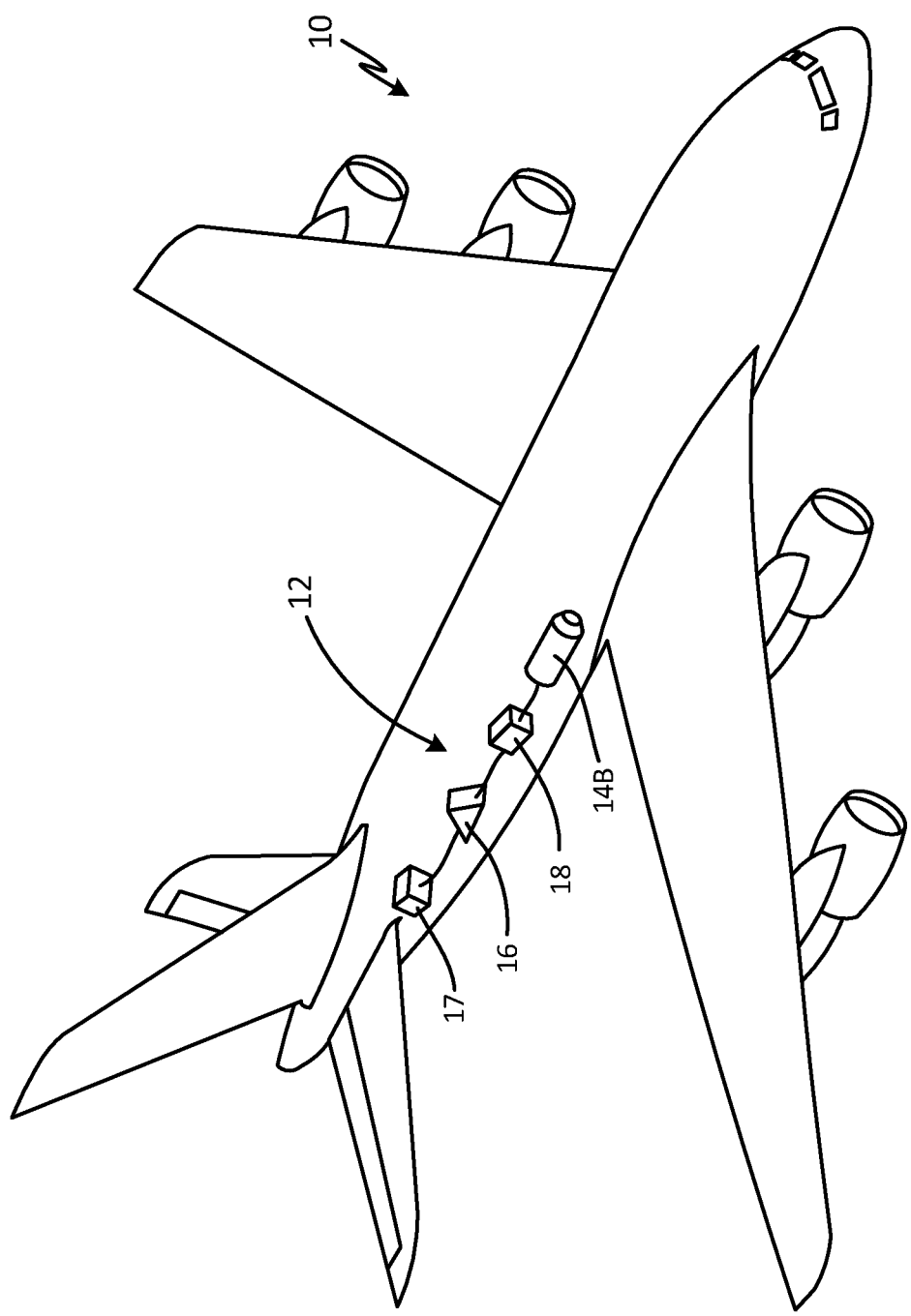
FIG. 1B is a schematic of an aircraft with a second embodiment of a potable water system.
Figure 1C:
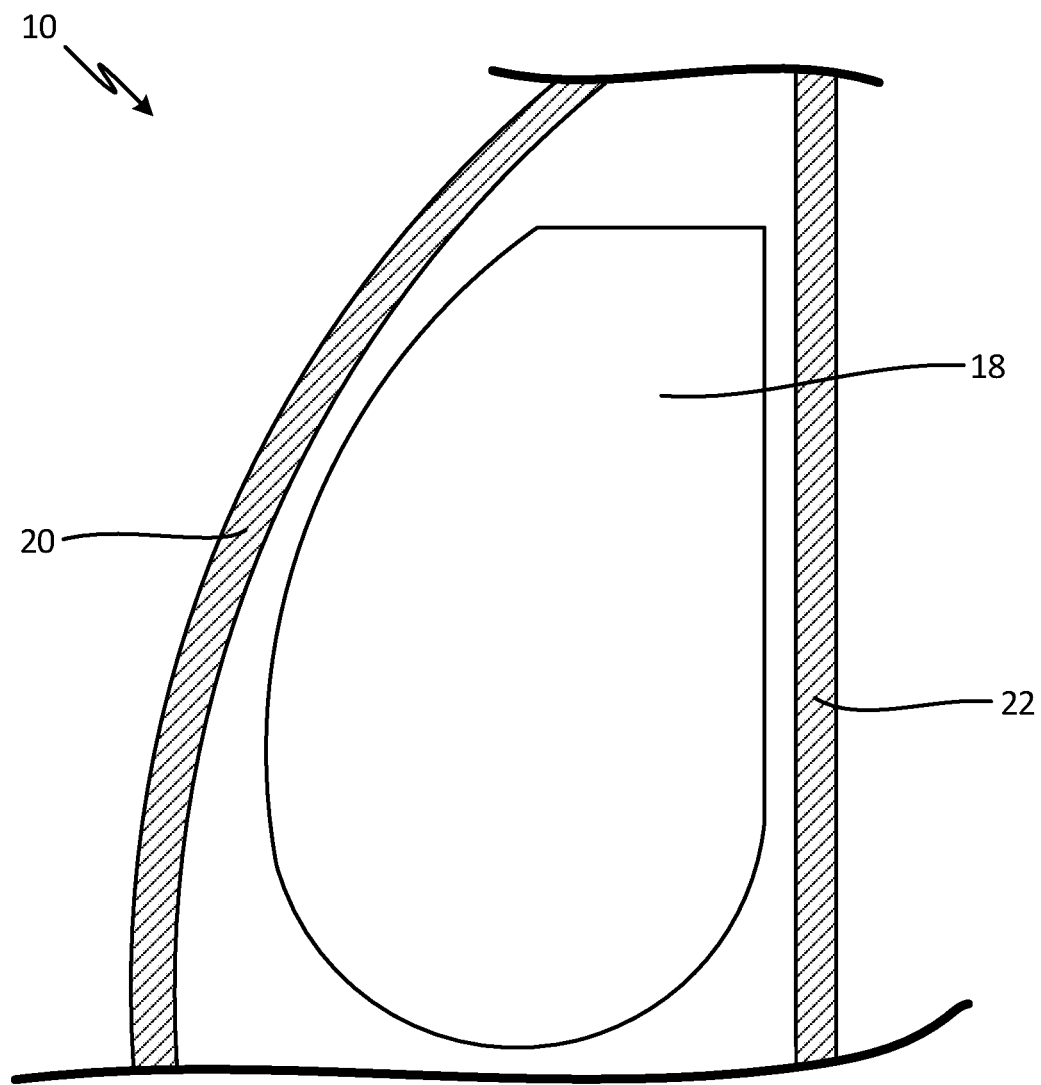
FIG. 1C is a cross-sectional view of an aircraft fuselage, showing a conformable tank.

FIG. 1A is a schematic of aircraft 10 with a first embodiment of potable water system 12, which includes hydraulic pump 14A, control valve 16, point of use 17, and conformable tank 18. FIG. 1B is a schematic of aircraft 10 with a second embodiment of potable water system 12, which includes compressed air source 14B, control valve 16, point of use 17, and conformable tank 18. FIG. 1C is a cross-sectional view of aircraft 10, showing conformable tank 18, fuselage 20, and internal structure 22.

Situated in an aft portion of aircraft 10 is potable water system 12. In the first embodiment shown in FIG. 1A, potable water system 12 includes hydraulic pump 14A, control valve 16, point of use 17, and conformable tank 18 that are connected to one another by hydraulic tubes, lines, or hoses. Fluid flow within potable water system 12 is induced using hydraulic pump 14A. Fluid flow within potable water system 12 is controlled using control valve 16. Potable water for use in potable water system 12 is stored in conformable tank 18. In the embodiment shown in FIG. 1B, potable water system 12 includes compressed air source 14B, control valve 16, point of use 17, and conformable tank 18 that are connected to one another by hydraulic tubes, lines, or hoses. Fluid flow within potable water system 12 is induced by compressed air source 14B. Fluid flow within potable water system 12 is controlled using control valve 16. Potable water for use in potable water system 12 is stored in conformable tank 18 at an elevated pressure, as compared to ambient pressure outside conformable tank 18.

As shown in FIG. 1C, conformable tank 18 is configured to conform to both fuselage 20 and internal structure 22. A curved wall on a first side of conformable tank 18 is configured to conform to the curvature of fuselage 20. Likewise, a flat wall on a second side of conformable tank 18 opposite of the curved wall is configured to conform to internal structure 22. FIG. 1C shows one embodiment of conformable tank 18 and is not meant to limit the disclosure to a single embodiment. Conformable tank 18 is conformable for use in a plurality of irregular aircraft spaces. The following description details two possible embodiments of conformable tank 18.

Figure 2:
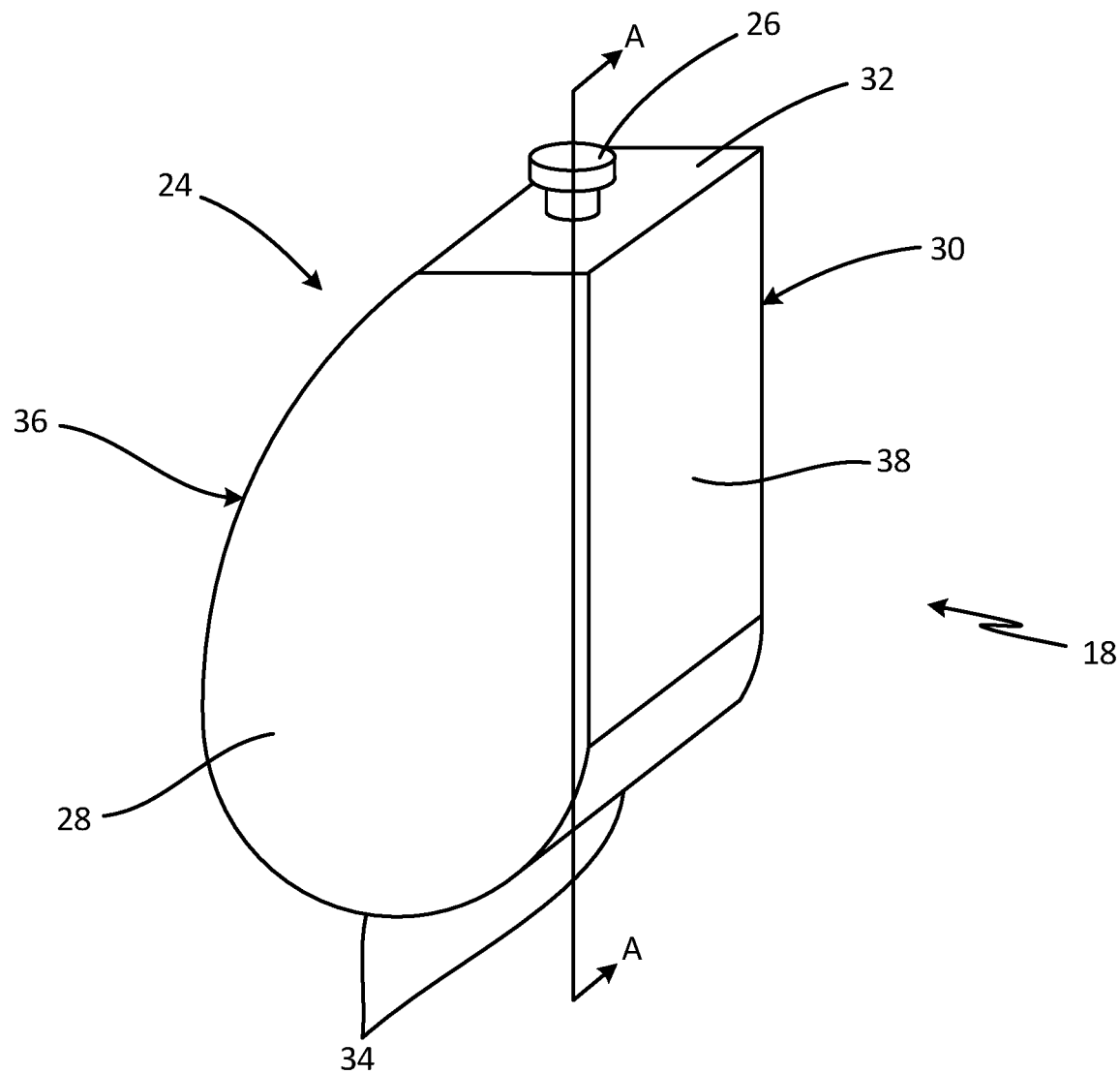
FIG. 2 is a perspective view of the conformable tank of FIG. 1C.

FIG. 2 is a perspective view of conformable tank 18. Conformable tank 18 includes body 24 and port 26. Body 24 includes front wall 28, rear wall 30, top wall 32, bottom wall 34, curved side wall 36, and flat side wall 38. In the embodiment shown in FIG. 2, front wall 28, rear wall 30, and top wall 32 are shown as flat walls and bottom wall 34 is shown as a curved wall. In alternate embodiments, front wall 28, rear wall 30, top wall 32 and bottom wall 34 can be flat walls, curved walls, or irregular shaped walls.

Conformable tank 18 is made out of a continuous fiber filament reinforced composite that is produced using a fused deposition modeling process in the embodiment shown in FIG. 2. In alternate embodiments, conformable tank 18 can be manufactured out of any suitable material using any suitable process. Conformable tank 18 includes body 24 that forms a housing for conformable tank 18. A fluid can be stored in body 24 of conformable tank 18. Port 26 extends through body 24 of conformable tank 18. Port 26 is an inlet/outlet for conformable tank 18 that allows a fluid to flow into and out of conformable tank 18. As conformable tank 18 is a pressurized tank, port 26 is used to allow the fluid to flow into and out of conformable tank 18 while maintaining the pressure in conformable tank 18. In alternate embodiments, other mechanisms can be used to allow the fluid to flow into and out of conformable tank 18.

Body 24 of conformable tank 18 includes front wall 28 that is positioned opposite of rear wall 30, top wall 32 that is positioned opposite of bottom wall 34, and curved side wall 36 that is positioned opposite of flat side wall 38. Front wall 28 is in contact with and connects to top wall 32, bottom wall 34, curved side wall 36, and flat side wall 38. Rear wall 30 is in contact with and connects to top wall 32, bottom wall 34, curved side wall 36, and flat side wall 38. Top wall 32 extends between and connects to front wall 28, rear wall 30, curved side wall 36, and flat side wall 38. Bottom wall 34 extends between and connects to front wall 28, rear wall 30, curved side wall 36, and flat side wall 38. Curved side wall 36 is in contact with and connects to front wall 28, rear wall 30, top wall 32, and bottom wall 34. Flat side wall 38 is in contact with and connects to front wall 28, rear wall 30, top wall 32, and bottom wall 34.

In the embodiment shown in FIG. 2, port 26 is situated on top wall 32. In alternate embodiments, port 26 can be situated on any of the walls of body 24, such as front wall 28, rear wall 30, top wall 32, bottom wall 34, curved side wall 36, or flat side wall 38. Further, in the embodiment shown in FIG. 2 there is only one port 26. In alternate embodiments, there can be a plurality of port 26, extending through the same wall or different walls of body 24. Port 26 is configured to aid in filling and emptying conformable tank 18. In the embodiment shown in FIG. 2, conformable tank 18 is designed to store potable water for use on aircraft 10 as a part of potable water system 12 (shown in FIG. 1A). Port 26 of conformable tank 18 can be connected by a tube to hydraulic pump 14A of potable water system 12, as shown in FIG. 1A. Likewise, port 26 of conformable tank 18 can be connected by a tube to compressed air source 14B and control valve 16 of potable water system 12, as shown in FIG. 1B.

Figure 3A:
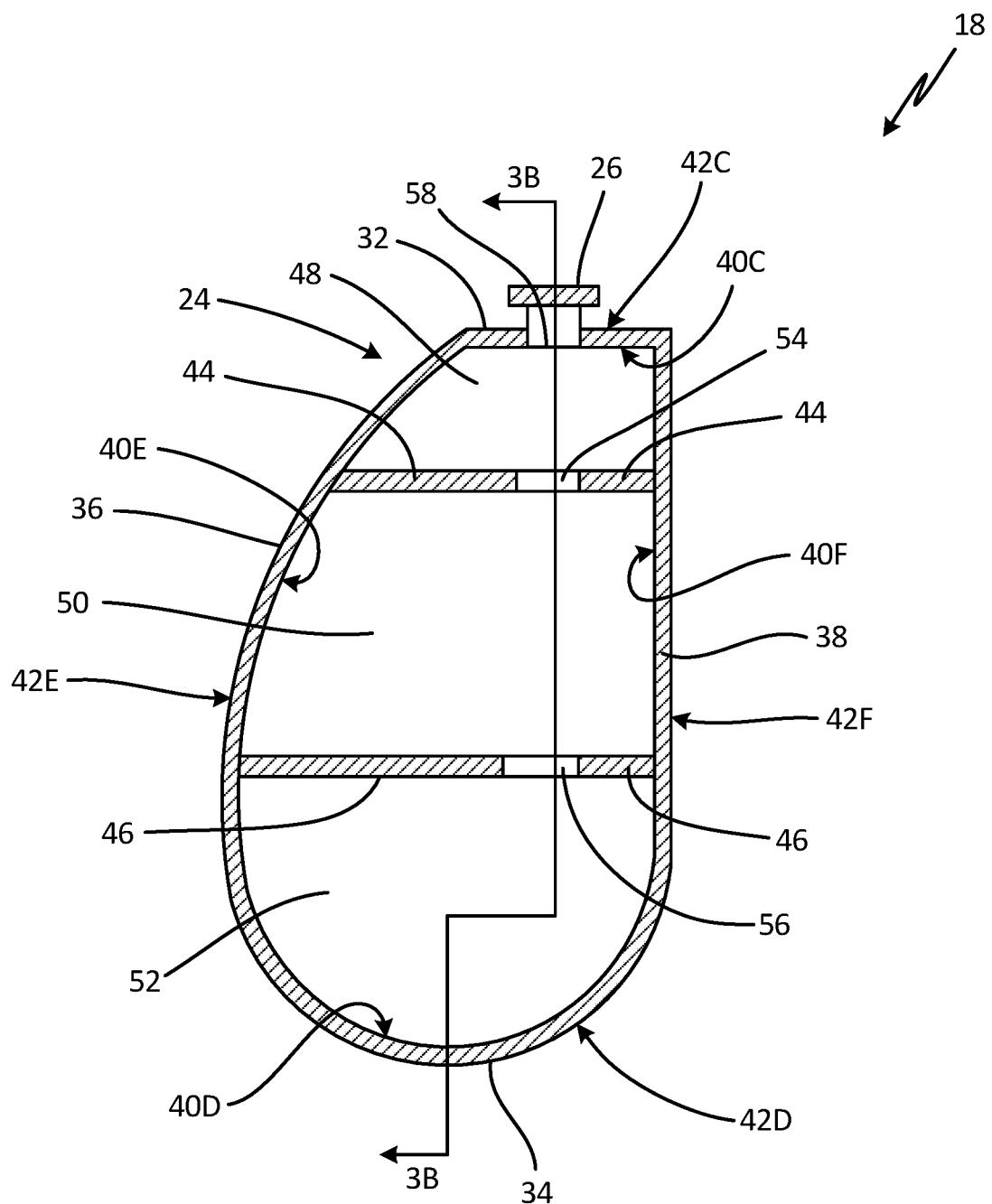
FIG. 3A is a side cross-sectional view of a first embodiment of the conformable tank taken along line A-A of FIG. 2.
Figure 3B:
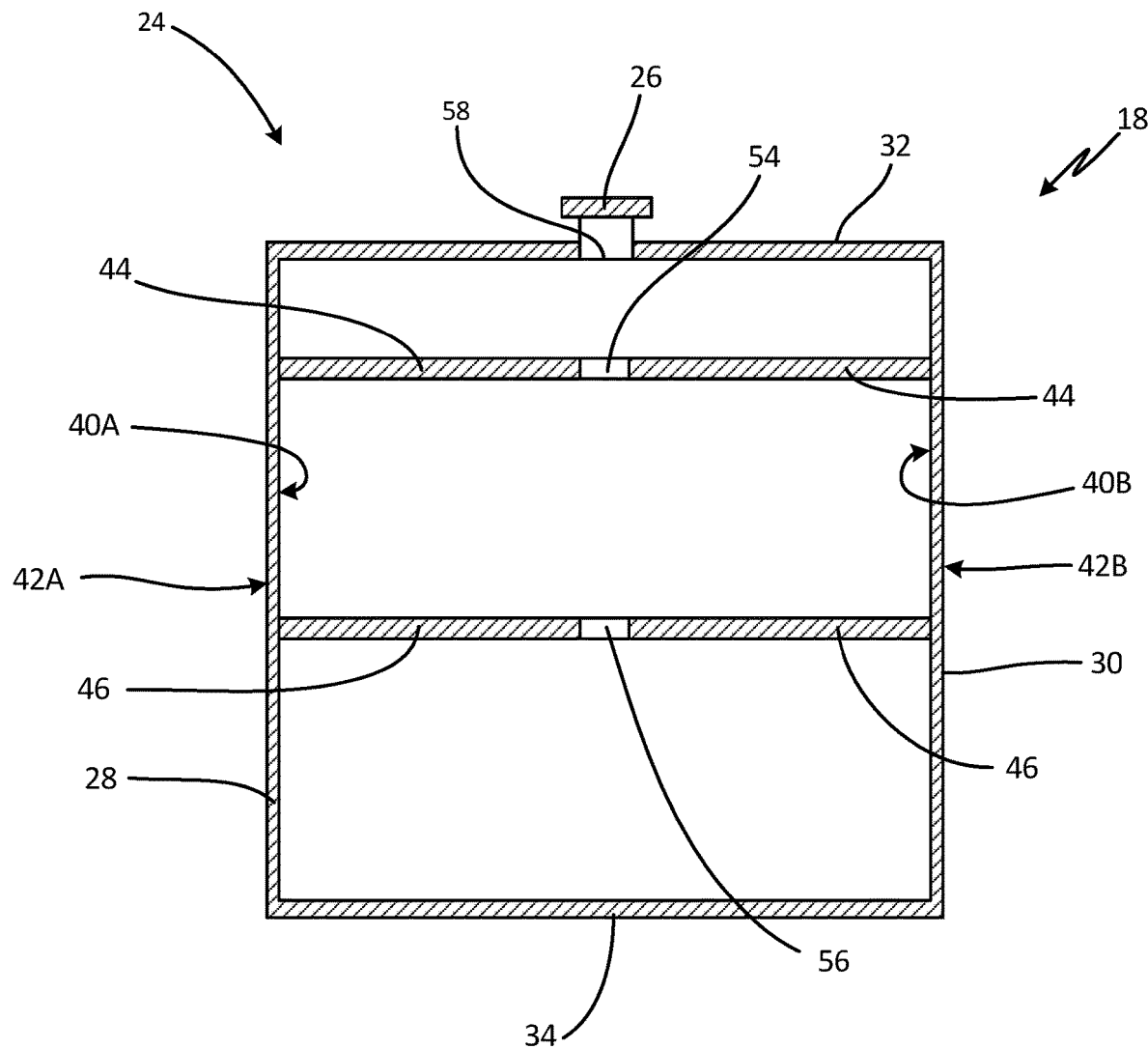
FIG. 3B is a side cross-section view of the first embodiment of the conformable tank taken along line 3B-3B of FIG. 3A.

FIG. 3A is a side cross-sectional view of a first embodiment of conformable tank 18 taken along line A-A of FIG. 2. FIG. 3B is a side cross-section view of the first embodiment of conformable tank 18 taken along line 3B-3B of FIG. 3A. Conformable tank 18 includes body 24 and port 26. Body 24 includes front wall 28, rear wall 30, top wall 32, bottom wall 34, curved side wall 36, and flat side wall 38. Front wall 28, rear wall 30, top wall 32, bottom wall 34, curved side wall 36, and flat side wall 38 include inner surfaces 40A, 40B, 40C, 40D, 40E, and 40F, and outer surfaces 42A, 42B, 42C, 42D, 42E, and 42F, respectively. Conformable tank 18 further includes first baffle 44, second baffle 46, first cavity 48, second cavity 50, third cavity 52, first aperture 54, second aperture 56, and third aperture 58.

Conformable tank 18 includes body 24 that forms a housing of conformable tank 18. Port 26 extends through body 24 of conformable tank 18 to provide an inlet/outlet to conformable tank 18. Body 24 of conformable tank 18 includes front wall 28 that is positioned opposite of rear wall 30, top wall 32 that is positioned opposite of bottom wall 34, and curved side wall 36 that is positioned opposite of flat side wall 38.

Front wall 28 includes inner surface 40A and outer surface 42A. Rear wall 30 includes inner surface 40B and outer surface 42B. Top wall 32 includes inner surface 40C and outer surface 42C. Bottom wall 34 includes inner surface 40D and outer surface 42D. Curved side wall 36 includes inner surface 40E and outer surface 42E. Flat side wall 38 includes inner surface 40F and outer surface 42F. Inner surfaces 40A, 40B, 40C, 40D, 40E, and 40F form an interior of conformable tank 18 and outer surfaces 42A, 42B, 42C, 42D, 42E, and 42F form an exterior of conformable tank 18.

Conformable tank 18 further includes first baffle 44 and second baffle 46 extending through an interior of conformable tank 18. First baffle 44 extends from inner surface 40E of curved side wall 36 to inner surface 40F of flat side wall 38. First baffle 44 also extends from inner surface 40A of front wall 28 to inner surface 40B of rear wall 30. Second baffle 46 extends from inner surface 40E of curved side wall 36 to inner surface 40F of flat side wall 38. Second baffle 46 also extends from inner surface 40A of front wall 28 to inner surface 40B of rear wall 30.

First baffle 44 and second baffle 46 are configured to act as internal supports and provide structural support to body 24 of conformable tank 18. Without first baffle 44 and second baffle 46, conformable tank 18 could deform under internal pressure. In the embodiment shown, conformable tank 18 includes two baffles. In alternate embodiments, conformable tank 18 can include any number of baffles.

First baffle 44 and second baffle 46 divide the interior of conformable tank 18 into first cavity 48, second cavity 50, and third cavity 52. First cavity 48 is defined as the volume enclosed by front wall 28, rear wall 30, top wall 32, curved side wall 36, flat side wall 38, and first baffle 44. Second cavity 50 is defined as the volume enclosed by front wall 28, rear wall 30, curved side wall 36, flat side wall 38, first baffle 44, and second baffle 46. Third cavity 52 is defined as the volume enclosed by front wall 28, rear wall 30, bottom wall 34, curved side wall 36, and flat side wall 38, and second baffle 46. First cavity 48, second cavity 50, and third cavity 52 are configured to store potable water, or any other fluid, at an elevated pressure in conformable tank 18.

Extending through first baffle 44 and fluidly connecting first cavity 48 and second cavity 50 is first aperture 54. Extending through second baffle 46 and fluidly connecting second cavity 50 and third cavity 52 is second aperture 56. The embodiment shown in FIGS. 3A-3B shows a single aperture extending through each baffle. Alternate embodiments may include any number of apertures extending through each baffle. Further, the apertures can be of equal shape and size or varying shape and size.

Extending through top wall 32 is third aperture 58. Third aperture 58 provides a means for filling and emptying conformable tank 18. Third aperture 58 can be fitted with port 26 or any other component used to aid in filling and emptying conformable tank 18. According to the embodiment shown in FIGS. 3A-3B, third aperture 58 extends through top wall 32. In alternate embodiments, third aperture 58 can extend through any of the walls of body 24, such as front wall 28, rear wall 30, top wall 32, bottom wall 34, curved side wall 36, or flat side wall 38.

Conformable tank 18 is configured to store fluids, particularly potable water, at an elevated pressure when compared to ambient pressure outside conformable tank 18. The baffles within conformable tank 18 provide structural support to prevent excessive deformation from the internal pressure while still allowing fluid to pass from cavity to cavity. Conformable tank 18 can be designed to fit in and conform to a plurality of irregular aircraft spaces.

Figure 4A:
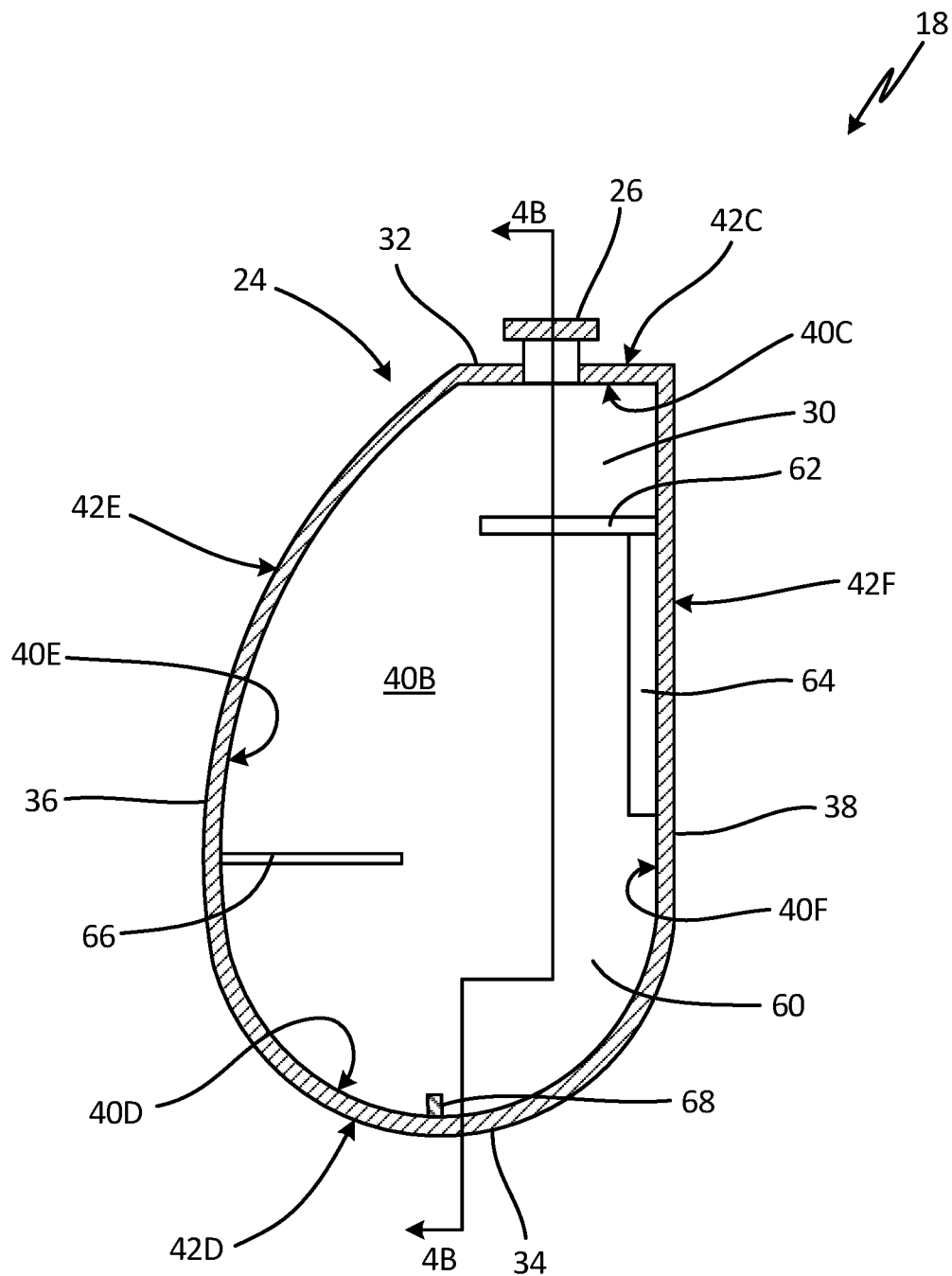
FIG. 4A is a side cross-sectional view of a second embodiment of the conformable tank taken along line A-A of FIG. 2.
Figure 4B:
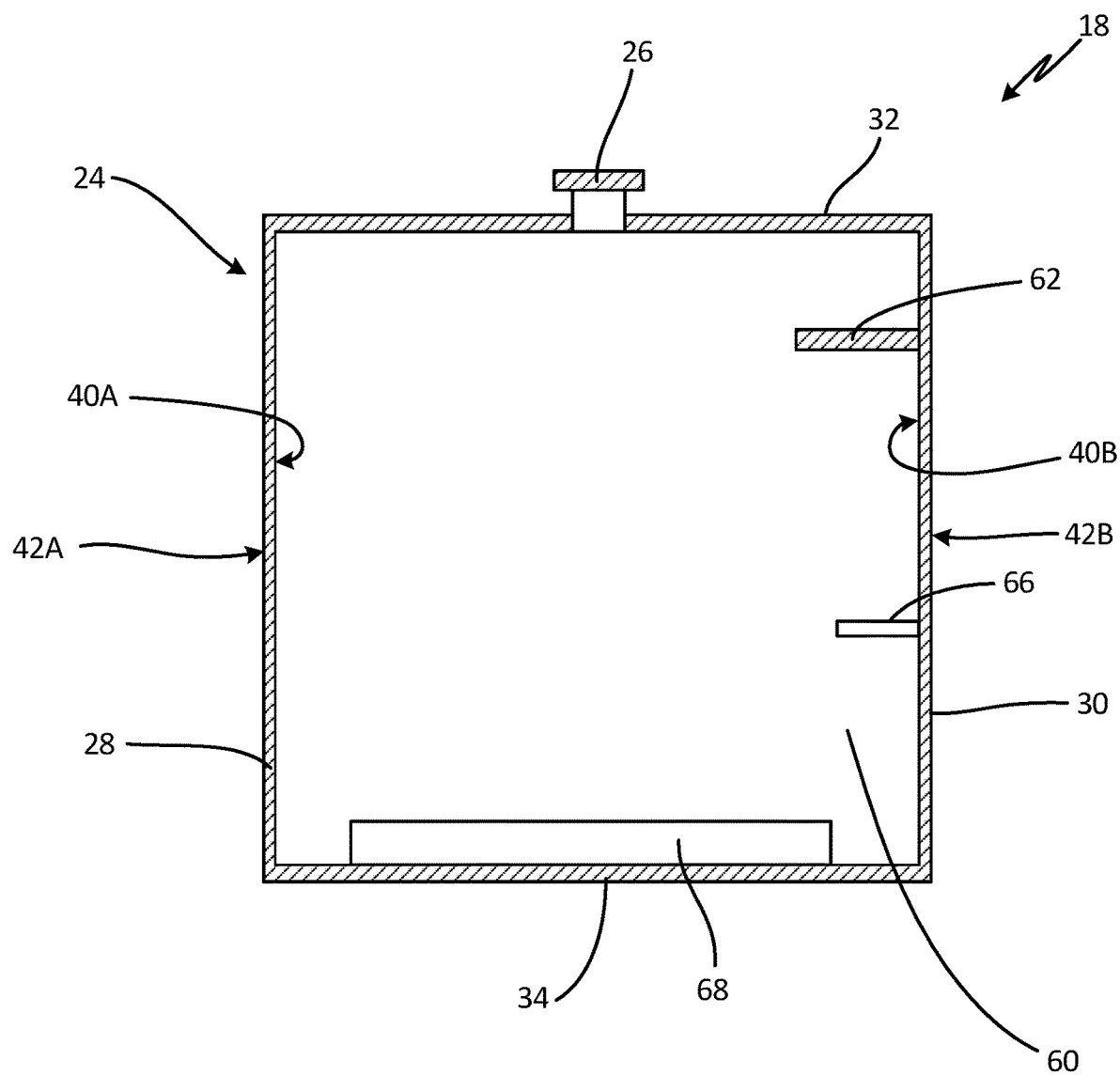
FIG. 4B is a side cross-sectional view of the second embodiment of the conformable tank taken along line 4B-4B of FIG. 4A.

FIG. 4A is a side cross-sectional view of a second embodiment of conformable tank 18 taken along line A-A of FIG. 2. FIG. 4B is a side cross-sectional view of the second embodiment of conformable tank 18 taken along line 4B-4B of FIG. 4A. Conformable tank 18 includes body 24 and port 26. Body 24 includes front wall 28, rear wall 30, top wall 32, bottom wall 34, curved side wall 36, and flat side wall 38. Front wall 28, rear wall 30, top wall 32, bottom wall 34, curved side wall 36, and flat side wall 38 include inner surfaces 40A, 40B, 40C, 40D, 40E, and 40F, and outer surfaces 42A, 42B, 42C, 42D, 42E, and 42F, respectively.

Conformable tank 18 further includes internal cavity 60, first rib 62, second rib 64, third rib 66, and fourth rib 68.

Conformable tank 18 includes body 24 that forms a housing of conformable tank 18. Port 26 extends through body 24 of conformable tank 18 to provide an inlet/outlet to conformable tank 18. Body 24 of conformable tank 18 includes front wall 28 that is positioned opposite of rear wall 30, top wall 32 that is positioned opposite of bottom wall 34, and curved side wall 36 that is positioned opposite of flat side wall 38.

Front wall 28 includes inner surface 40A and outer surface 42A. Rear wall 30 includes inner surface 40B and outer surface 42B. Top wall 32 includes inner surface 40C and outer surface 42C. Bottom wall 34 includes inner surface 40D and outer surface 42D. Curved side wall 36 includes inner surface 40E and outer surface 42E. Flat side wall 38 includes inner surface 40F and outer surface 42F. Inner surfaces 40A, 40B, 40C, 40D, 40E, and 40F form an interior of conformable tank 18 and outer surfaces 42A, 42B, 42C, 42D, 42E, and 42F form an exterior of conformable tank 18. Internal cavity 60 is formed in the interior of conformable tank 18.

Conformable tank 18 includes first rib 62, second rib 64, third rib 66, and fourth rib 68 in cavity 60 to provide structural support for conformable tank 18. First rib 62 extends along inner surface 40B of rear wall 30 and abuts inner surface 40F of flat side wall 38 and protrudes into internal cavity 60. Second rib 64 extends along inner surface 40F of flat side wall 38 and protrudes into internal cavity 60. Third rib 66 extends along inner surface 40B of rear wall 30 and protrudes into internal cavity 60. Fourth rib 68 extends from inner surface 40D of bottom wall 34 and protrudes into internal cavity 60.

The embodiment shown in FIGS. 4A-4B is one embodiment of conformable tank 18 with ribs utilized as internal supports. The ribs provide structural support to conformable tank 18 and prevent it from deforming excessively under internal pressure. This embodiment is not meant to limit the disclosure to a single embodiment. In alternate embodiments, conformable tank 18 can include a plurality of ribs of varying shapes and sizes. The ribs can connect to any of the walls of body 24 and extend along or protrude from the walls in any suitable manner.

Conformable tank 18 is configured to store fluids, particularly potable water, at an elevated pressure when compared to ambient pressure outside conformable tank 18. The ribs within conformable tank 18 provide structural support to prevent excessive deformation from the internal pressure while still allowing fluid flow within the internal cavity. Conformable tank 18 can be designed to fit in and conform to a plurality of irregular aircraft spaces.

Figure 5:
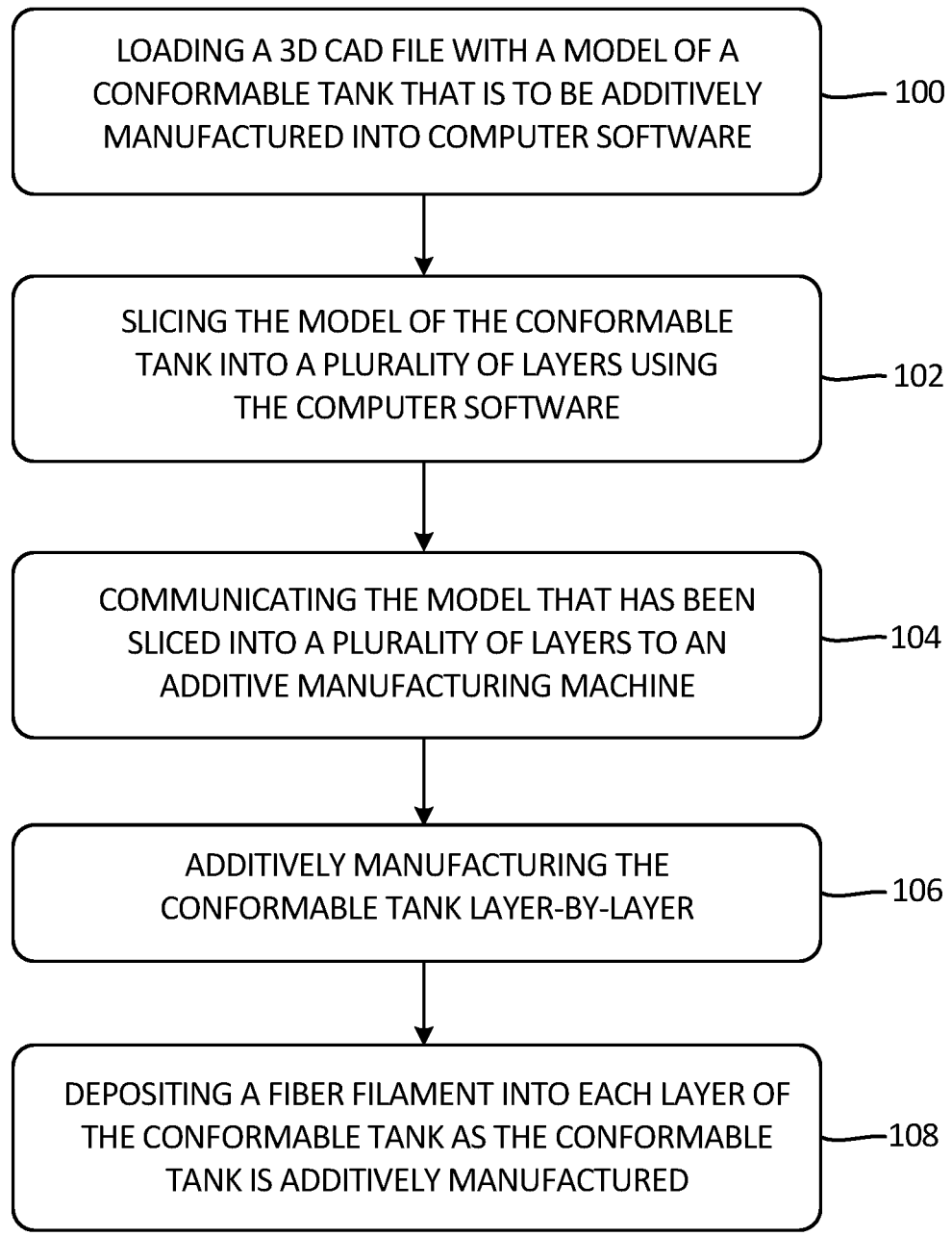
FIG. 5 is a flow chart showing a method of manufacturing the conformable tank of FIG. 2.

FIG. 5 is a flow chart showing a method of manufacturing conformable tank 18. The flow chart includes steps 100-108.

Step 100 includes loading a 3D computer aided design (CAD) file with a model of a part that is to be additively manufactured into computer software. The 3D CAD file can include a model of conformable tank 18 that is to be additively manufactured. Step 102 includes slicing the model of the 3D CAD file into a plurality of layers. The layers do not need to be parallel to each other. This includes slicing the model of conformable tank 18 into a plurality of layers. The plurality of layers of conformable tank 18 will be additively manufactured. Step 104 includes communicating the model of the 3D CAD file that has been sliced into a plurality of layers to an additive manufacturing machine. This includes communicating the model for conformable tank 18 that has been sliced into a plurality of layers to an additive manufacturing machine.

Step 106 includes additively manufacturing the part layer-by-layer. This includes additively manufacturing conformable tank 18 layer-by-layer. Conformable tank 18 can be manufactured according to an additive manufacturing process such as fused deposition modeling. The fused deposition modeling process includes the following. A filament of composite material is fed through and heated in an extrusion nozzle, melting the composite material. The melted composite material is extruded from the extrusion nozzle and deposited on a working surface in a single layer. Once the composite material is on the working surface it hardens to form a solidified layer. Either the extrusion nozzle or the working surface moves relative to the other to provide space to deposit a subsequent layer on the previously deposited layer. Layer after layer, the composite material is deposited until the final 3D part is produced.

Step 108 includes depositing a fiber filament into each layer of the part as the part is additively manufactured. At the same time that the composite material is being fed through and heated in the extrusion nozzle, another nozzle feeds a fiber filament. The fiber filament is fed to the same location as the composite material, creating a fiber filament covered by a composite material known as a fiber filament reinforced composite. The additive manufacturing process is described as utilizing two separate nozzles to deposit the composite and the fiber filament, but in another method one nozzle can deposit both the composite and the fiber filament simultaneously.

The fiber filament used to reinforce the composite material can be fiberglass, carbon fiber, synthetic fiber (such as Kevlar®), or other materials known to a person skilled in the art. The fiber filament is added to the composite to improve the material properties of the part, including but not limited to strength, toughness, impact resistant, and temperature resistance.

Traditionally, pressurized tanks for use on aircraft have been produced using metal alloys and standard manufacturing practices. This produces fairly heavy tanks that are costly to produce for complex geometry. The present disclosure creates conformable tank 18 that is made out of a potable water safe composite material and is manufactured using additive manufacturing technology. Using a composite material is advantageous because it results in lighter weight pressurized tanks when compared to traditional metal alloy tanks. Using additive manufacturing to produce the pressurized tanks is beneficial because it allows for complex geometry to be produced for specific aircraft shape, space, and size requirements. Further, using additive manufacturing to produce the pressurized tanks for complex geometry is cost effective when compared to traditional manufacturing methods for both carbon-epoxy composites and metal alloys, because it requires less tooling and much less labor. Producing conformable tank 18 using a continuous fiber filament reinforced composite according to the fused deposition modeling process results in a highly conformable, lightweight, and inexpensive pressurized tank that can be used to store potable water in irregular shaped aircraft spaces.

Discussion of Possible Embodiments

The following are non-exclusive descriptions of possible embodiments of the present invention.

A conformable tank includes a body with a plurality of walls defining a cavity in the body, and an internal support connected to an internal surface of one of the plurality of walls of the body and protruding into the cavity of the body. The body and the internal support are an additively manufactured integral structure formed by a fiber filament reinforced composite material.

The conformable tank of the preceding paragraph can optionally include, additionally and/or alternatively, any one or more of the following features, configurations and/or additional components:

Wherein the additive manufacturing process is a fused deposition modeling process.

Wherein the fiber filament reinforced composite material includes a fiber filament in a composite material.

Wherein the fiber filament is selected from the group consisting of fiberglass, carbon, synthetic fiber, and combinations thereof.

Wherein an aperture extends through one of the plurality of walls of the body.

Wherein a port is positioned in the aperture extending through one of the plurality of walls of the body.

Wherein the plurality of walls includes a flat side wall that includes an inner surface and an outer surface; a curved side wall that includes an inner surface and an outer surface; a top wall that includes an inner surface and an outer surface, wherein the top wall extends between and connects the flat side wall and the curved side wall; a bottom wall that includes an inner surface and an outer surface, wherein the bottom wall extends between and connects the flat side wall and the curved side wall; a front wall that includes an inner surface and an outer surface, wherein the front wall contacts and connects the flat side wall, the curved side wall, the top wall, and the bottom wall; and a rear wall that includes an inner surface and an outer surface, wherein the rear wall contacts and connects the flat side wall, the curved side wall, the top wall, and the bottom wall.

Wherein the curved side wall of the conformable tank is configured to conform to an aircraft fuselage.

Wherein the internal support is a baffle that extends across the conformable tank from the inner surface of the flat side wall to the inner surface of the curved side wall, and wherein the baffle extends across the conformable tank from the inner surface of the rear wall to the inner surface of the front wall.

Wherein the baffle creates a first internal cavity that is defined by the inner surface of the bottom wall, the inner surface of the flat side wall, the inner surface of the curved side wall, and the baffle and a second internal cavity that is defined by the inner surface of the top wall, the inner surface of the flat side wall, the inner surface of the curved side wall, and the baffle.

Wherein an aperture extends through the baffle to allow fluid connection between the first internal cavity and the second internal cavity.

Wherein the internal support is a rib that is connected to at least one of the plurality of walls of the body, and wherein the rib extends into the internal cavity.

Wherein the conformable tank is configured to store potable water.

A method of manufacturing a conformable tank including loading a CAD file with a model of a conformable tank that is to be additively manufactured into computer software. The model of the conformable tank is sliced into a plurality of layers using the computer software. The model that has been sliced into a plurality of layers is communicated to an additive manufacturing machine. The conformable tank is additively manufactured layer-by-layer with a fiber filament in each layer of the conformable tank.

The method of the preceding paragraph can optionally include, additionally and/or alternatively, any one or more of the following features, configurations and/or additional components:

Wherein additively manufacturing the conformable tank includes additively manufacturing the conformable tank using a fused deposition modeling process.

Wherein the fiber filament is selected from the group consisting of fiberglass, carbon, synthetic fiber, and combinations thereof.

Wherein additively manufacturing the conformable tank includes additively manufacturing the conformable tank out of a composite material.

Wherein additively manufacturing the conformable tank includes feeding a filament of composite material into an extrusion nozzle; melting the filament of composite material; and extruding the melted composite material onto a working surface.

Wherein the conformable tank includes a body with a plurality of walls defining a cavity in the body; and an internal support connected to an internal surface of one of the plurality of wall of the body and protruding into the cavity of the body.

Wherein the plurality of walls of the conformable tank includes a flat side wall that includes an inner surface and an outer surface; a curved side wall that includes an inner surface and an outer surface; a top wall that includes an inner surface and an outer surface, wherein the top wall extends between and connects the flat side wall and the curved side wall; a bottom wall that includes an inner surface and an outer surface, wherein the bottom wall extends between and connects the flat side wall and the curved side wall; a front wall that includes an inner surface and an outer surface, wherein the front wall contacts and connects the flat side wall, the curved side wall, the top wall, and the bottom wall; and a rear wall that includes an inner surface and an outer surface, wherein the rear wall contacts and connects the flat side wall, the curved side wall, the top wall, and the bottom wall.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A conformable tank comprising:
   a body with a plurality of walls defining a cavity in the body, wherein the plurality of walls includes:
   a flat side wall;
   a curved side wall opposite of the flat side wall;

a flat top wall that extends between and connects the flat side wall and the curved side wall, the flat top wall comprising a port; a bottom wall that extends between and connects the flat side wall and the curved side wall;

a front wall that contacts and connects the flat side wall, the curved side wall, the flat top wall, and the bottom wall;

a flat rear wall that contacts and connects the flat side wall, the curved side wall, the flat top wall, and the bottom wall;

an internal support connected to an internal surface of one of the plurality of walls of the body and protruding into the cavity of the body; and a plane normal to the flat side wall and bisecting the curved side wall; wherein the curved side wall is not symmetrical relative to the plane; and wherein the body and the internal support are an additively manufactured integral structure formed by a fiber filament reinforced composite material.

2. The conformable tank of claim 1, wherein the additively manufactured integral structure is formed using a fused deposition modeling process.

3. The conformable tank of claim 1, wherein the fiber filament reinforced composite material includes a fiber filament in a composite material.

4. The conformable tank of claim 3, wherein the fiber filament is selected from the group consisting of fiberglass, carbon, synthetic fiber, and combinations thereof.

5. The conformable tank of claim 1, wherein an aperture extends through one of the plurality of walls of the body.

6. The conformable tank of claim 5, wherein the port is positioned in the aperture extending through one of the plurality of walls of the body.

7. The conformable tank of claim 1, wherein the curved side wall of the conformable tank is configured to conform to an aircraft fuselage.

8. The conformable tank of claim 1, wherein the internal support is a baffle that extends across the conformable tank from the inner surface of the flat side wall to the inner surface of the curved side wall, and wherein the baffle extends across the conformable tank from the inner surface of the flat rear wall to the inner surface of the front wall.

9. The conformable tank of claim 8, wherein the baffle creates a first internal cavity that is defined by the inner surface of the bottom wall, the inner surface of the flat side wall, the inner surface of the curved side wall, and the baffle and a second internal cavity that is defined by the inner surface of the top wall, the inner surface of the flat side wall, the inner surface of the curved side wall, and the baffle.

10. The conformable tank of claim 9, wherein an aperture extends through the baffle to allow fluid connection between the first internal cavity and the second internal cavity.

11. The conformable tank of claim 1, wherein the internal support is a rib that is connected to at least one of the plurality of walls of the body, and wherein the rib extends into the internal cavity.

12. The conformable tank of claim 1, wherein the conformable tank is configured to store potable water.

13. A method of manufacturing a conformable tank, the method comprising:

loading a CAD file with a model of a conformable tank that is to be additively manufactured into computer software;

slicing the model of the conformable tank into a plurality of layers using the computer software;

communicating the model that has been sliced into a plurality of layers to an additive manufacturing machine; and additively manufacturing the conformable tank layer-by-layer with a fiber filament in each layer of the conformable tank;

wherein the conformable tank comprises:
a flat side wall that includes an inner surface and an outer surface;
a curved side wall that includes an inner surface and an outer surface;
a flat top wall that includes an inner surface and an outer surface, wherein the top wall extends between and connects the flat side wall and the curved side wall, the flat top wall comprising a port;
a bottom wall that includes an inner surface and an outer surface, wherein the bottom wall extends between and connects the flat side wall and the curved side wall;
a front wall that includes an inner surface and an outer surface, wherein the front wall contacts and connects the flat side wall, the curved side wall, the flat top wall, and the bottom wall;
a flat rear wall that includes an inner surface and an outer surface, wherein the flat rear wall contacts and connects the flat side wall, the curved side wall, the flat top wall, and the bottom wall; and
a plane normal to the flat side wall and bisecting the curved side wall, wherein the curved side wall is not symmetrical relative to the plane.

14. The method of claim 13, wherein additively manufacturing the conformable tank includes additively manufacturing the conformable tank using a fused deposition modeling process.

15. The method of claim 13, wherein the fiber filament is selected from the group consisting of fiberglass, carbon, synthetic fiber, and combinations thereof.

16. The method of claim 13, wherein additively manufacturing the conformable tank includes additively manufacturing the conformable tank out of a composite material.

17. The method of claim 13, wherein additively manufacturing the conformable tank further comprises:

feeding a filament of composite material into an extrusion nozzle;

melting the filament of composite material; and extruding the melted composite material onto a working surface.

18. The method of claim 13, wherein the conformable tank comprises:

a body with a plurality of walls defining a cavity in the body; and an internal support connected to an internal surface of one of the plurality of wall of the body and protruding into the cavity of the body.

* * * * *